May 7, 1929. J. D. COMPAIN 1,712,258
CONTINUOUS FILTER
Filed Nov. 28, 1927
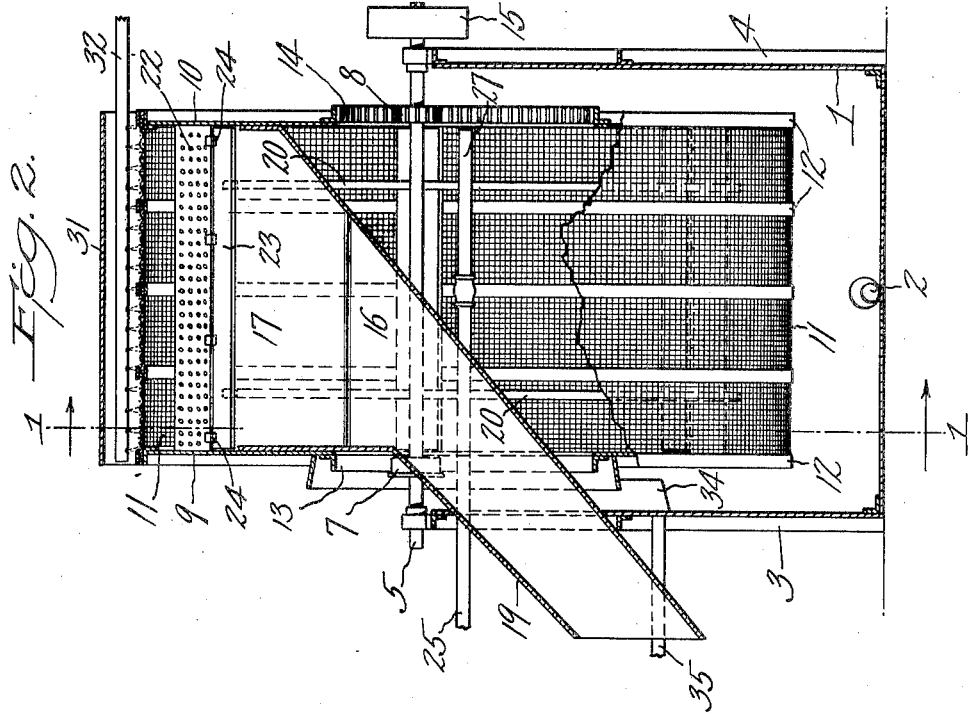
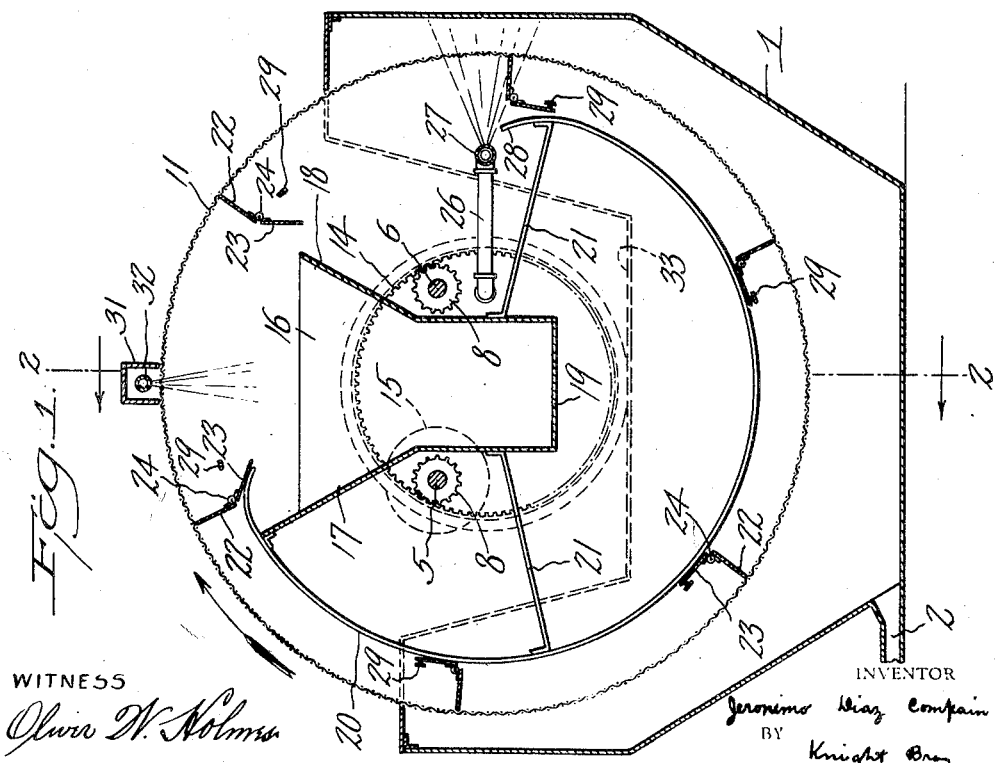

Patented May 7, 1929.

1,712,258

UNITED STATES PATENT OFFICE.

JERONIMO DIAZ COMPAIN, OF STEWART, CUBA.

CONTINUOUS FILTER.

Application filed November 28, 1927, Serial No. 236,192, and in Cuba December 21, 1926.

This invention relates to filtering machines and more especially to that type of filtering machines in which the filtrate is uninterruptedly drawn off under the action of gravity from a continuing supply of fluid while the refuse or residue of such filtering operation is being continuously discharged from the machine.

The general object of my invention is to provide an improved construction and arrangement of parts in a machine of this nature wherein a traveling filter screen intercepts the refuse or residue in a continuing supply of fluid and conveys it to a suitable point where it is collected and discharged from the machine.

One of the objects of the present invention is to provide an improved construction for a filter of the rotary drum type which can be inexpensively constructed, economically and efficiently operated.

Other objects of invention will appear in the specification and be pointed out in the appended claims, reference being had to the accompanying drawings which illustrate a preferred embodiment of the underlying principles of my invention.

In the drawings

Figure 1 is a vertical section of a filtering machine constructed in accordance with the principles of my invention, said section corresponding to the line 1—1, of Figure 2.

Figure 2 is a vertical section of the same corresponding to the line 2—2, of Figure 1, parts being broken away and parts shown in side elevation.

Referring more particularly to the drawings, in the embodiment of my invention shown therein, an outer housing 1 is provided with a discharge outlet 2, said housing being adapted to collect the filtrate from a rotary filter drum arranged therein. Secured to the side walls of housing 1 are a plurality of standards or uprights 3 and 4. In the upper ends of standards 3 and 4 are journalled laterally-spaced shafts 5 and 6, each of said shafts being provided at one end with a drum-supporting roller 7 and at its other end with a spur pinion 8. Rotatably supported by means of the rollers 7 and spur pinions 8 is a rotary drum which comprises the parts hereinafter described. Secured to the outer peripheries of laterally-spaced annular plates 9 and 10 is a reticulated peripheral wall 11 which may be reinforced at suitable intervals by means of circumferential bands 12. Secured to the annular plate 9 around the inner periphery thereof is a circular track 13 which has running contact with the supporting rolls 7, 7. Secured to the annular plate 10 around the inner periphery thereof is an annular gear 14 which meshes with the spur pinions 8, 8 carried by the shafts 5 and 6. Keyed to an outer end of shaft 5 is a power-driven pulley 15. It will be understood from this description that the rotary drum is supported by the rollers 7, 7 at one end of its axis and at the other end of its axis is supported by the spur pinions 8, 8, power being delivered to said filter drum through the pulley 15, shaft 5, spur gear 8, and annular gear 14. Arranged within the rotary drum is a hopper 16 provided with inclined side walls 17 and 18 which converge toward a laterally-presented chute 19 which, as shown in Figure 2, is adapted to discharge through the central opening in annular plate 9. Spaced inwardly from the reticulated peripheral wall 11 of the filter drum are a plurality of part-circular ribs or guides 20, said ribs or guides being rigidly connected at their upper left hand ends, according to Figure 1, to the inclined walls 17 and hopper 16. Suitable supports or braces 21 are arranged between the chute 19 and the ribs or guides 20 at intermediate points. Arranged at regular intervals around the inner wall of the peripheral screen 11 and presented inwardly therefrom are a plurality of perforated plates or reticulated vanes 22, to the inner edges of which are movably connected leaf extensions 23. For this purpose, hinges 24 may be employed along the adjoining edges of vanes 22 and leafs 23. A fluid supply pipe 25 which extends through the central opening in annular plate 9, is provided with a centrally disposed radial branch 26 to the outer end of which is connected a pipe section 27, said section 27 being provided with suitable nozzle outlets for projecting the spray of the fluid onto the reticulated screen 11 as said screen revolves.

From an inspection of Figure 1, it will be seen that as each of the vanes 22 approaches the inwardly deflected extremities 28 of the ribs or guides 20, the leaf 23 hinged thereto comes into slidable engagement with said ribs or guides 20. For each leaf 23, a rigid stop bar 29 is arranged to limit the outward movement of said leaf, said stop bar being secured at opposite ends to the annular plates 9 and 10. As each leaf 23 approaches the inwardly deflected extremities of the ribs or guides 20, said leaf falls under its own weight and forms an extension of the vane 22. It will be seen, therefore, that as each of the vanes 22 moves downwardly from the spray nozzle 27 and in a clockwise direction around the ribs or guides, the filtrate trickles through the circumferential screen 11 as well as through the vanes 22. At the same time the refuse or residue is intercepted by the screen 11 and as each of the vanes 22 begins its upward movement, it will begin to serve as the bottom of a pocket, the forwardly presented leaf 23 connected thereto serving as a guard for retaining the refuse in said pocket. As the vane 22 approaches the upper end of the ribs or guides 20, the downward movement of said leaf permits the refuse or residue to fall into the hopper 16. Arranged above the rotary filter drum is an inverted channel-shaped housing 31 through which extends a supply pipe 32 provided with downwardly presented nozzle openings through which jets of water, compressed air, or other fluids, may be projected onto the screen 11 for removing the refuse that has been caught in the meshes of the screen 11. This scavenging action also becomes effective upon the vanes 22 and leaves 23 when said parts are in vertically extended positions. In order to prevent an undesirable accidental accumulation of filtrate within the housing 1, said housing may be cut away at 33, as shown in dotted lines in Figure 1, the discharge therefrom being deposited in a trench 34 provided with a discharge pipe 35.

I claim:

1. In a filter, the combination with a drum rotatable on a substantially horizontal axis, of a refuse-hopper arranged within said drum, a plurality of radial vanes presented inwardly from the peripheral wall of said drum, said radial vanes being provided with movable extensions, means for retaining said extensions flexed with respect to said radial vanes during the upward movements of the latter and for releasing said extensions to discharge into said refuse-hopper, and fluid-conveying means discharging within said drum.

2. In a filter of the character described, the combination with a rotary drum mounted on a substantially horizontal axis, said rotary drum being provided with a reticulated peripheral wall, a plurality of radial vanes presented inwardly from the reticulated peripheral wall of said rotary drum, a fluid supply pipe discharging into said rotary drum, a refuse-discharging hopper arranged within said drum, a part-circular guide arranged within and adjacent to the inner edges of said radial vanes, and a movable extension connected to the inner edge of each of said radial vanes, said part-circular guide being arranged to hold said movable extensions in forwardly flexed position with respect to the radial vanes to which they are connected and terminating adjacent to a plane above the upper edge of said refuse-discharging hopper, said movable extensions being thereby released into position to discharge the accumulated refuse into said hopper.

3. In a filter of the character described, the combination with a receiving tank for filtered liquid, of a filter drum rotatable on a substantially horizontal axis, said filter drum being provided with a reticulated peripheral wall and arranged to discharge filtered liquid into said receiving tank, means for rotating said filter drum, part-circular guides spaced inwardly from and concentrically arranged with respect to said reticulated peripheral wall of the filter drum, a plurality of radial vanes presented inwardly from the cylindrical wall of said filter drum, said vanes being provided with movable extensions adapted to slidably engage said part-circular guides, and a fluid supply pipe extending into said filter drum and discharging on to said reticulated peripheral wall of said filter drum.

4. In a filter of the character described, the combination with a receiving tank for filtered liquid, of a filter drum rotatable on a substantially horizontal axis and arranged to discharge filtered liquid into said receiving tank, said filter drum comprising axially-spaced end walls provided with central circular openings therein, and a reticulated peripheral wall, rotary supports rotatably engaging the peripheral edges of the openings in said end walls, part-circular guides spaced inwardly from and concentrically arranged with respect to the reticulated peripheral wall of said filter drum, a plurality of radial vanes presented inwardly from the peripheral wall of said filter drum, said vanes being provided with movable extensions adapted to slidably engage said part-circular guides, and a fluid supply pipe extending thru the opening in one end wall of said filter drum and discharging against the reticulated peripheral wall of said filter drum.

5. In a machine of the character described, the combination with a filter drum rotatable on a substantially horizontal axis, said filter drum being provided with a refuse-screening peripheral wall, a refuse-discharging hopper arranged within said drum, a plurality of reticulated vanes presented radially inwardly from the cylindrical wall of said filter drum, movable extensions connected to the inner edges of said radial vanes, a fluid supply pipe arranged to discharge outwardly through the peripheral wall of said filter drum, and means for holding said movable extensions in forwardly-presented positions from said reticulated vanes as they rise above said refuse-discharging hopper and releasing said extensions to discharge into said hopper.

6. In a machine of the character described, the combination with a rotary filter drum provided with a reticulated peripheral wall, a refuse-discharging hopper arranged within said drum, said hopper being provided with an upwardly-presented opening, a plurality of reticulated vanes presented radially inwardly from the cylindrical wall of said filter drum, said vanes being provided with movable leaves, a fluid supply pipe arranged to discharge on to the inner peripheral wall of said filter drum, and means for holding said leaves flexed with respect to said vanes during their movements from said fluid supply pipe to the upper edge of said hopper and for permitting said leaves to drop into refuse-discharging position as they come into position above said hopper.

7. In a machine of the character described, the combination with a filter drum rotatable on a substantially horizontal axis, said filter drum being provided with a reticulated peripheral wall, a refuse-discharging hopper arranged within said drum, said hopper being provided with an upwardly-presented opening, a plurality of part-circular fixed guides concentric with and spaced inwardly from the peripheral wall of said drum, a plurality of reticulated vanes presented inwardly towards said fixed guides from the cylindrical wall of said filter drum, and extension leaves pivotally connected to the inner edges of said vanes and movable into and out of engagement with said part-circular guides.

8. In a machine of the character described, the combination with a filter drum rotatable on a substantially horizontal axis, said filter drum being provided with a reticulated peripheral wall, of a plurality of part-circular fixed guides concentric with and spaced inwardly from the peripheral wall of said drum, a plurality of reticulated vanes presented radially inwardly from the cylindrical wall of said filter drum, said vanes being provided with movable leaves presented forwardly from said vanes and slidably engaging said part-circular guides, a fluid supply pipe arranged to discharge on to the inner peripheral wall of said filter drum, and a refuse hopper arranged to receive refuse from said vanes at the ends of said guides.

9. In a machine of the character described, the combination with a filter drum rotatable on a substantially horizontal axis, said filter drum being provided with a reticulated peripheral wall, of a refuse-discharging hopper arranged within said drum, said hopper being provided with an upwardly-presented opening, a plurality of part-circular fixed guides concentric with and spaced inwardly from the peripheral wall of said drum, a plurality of reticulated vanes presented radially inwardly from the cylindrical wall of said filter drum, said vanes being provided with movable leaves presented forwardly from said vanes and slidably engaging said part-circular guides, a fluid supply pipe arranged to discharge on to the inner peripheral wall of said filter drum, and a supply pipe for cleansing fluid extending above said filter drum and discharging downwardly thru the reticulated peripheral wall thereof and into said refuse-discharging hopper.

10. In a filter of the character described, the combination with a receiving tank for filtered liquid, of a filter drum rotatable on a substantially horizontal axis within said receiving tank, said filter drum being provided with a reticulated peripheral wall, means for rotating said filter drum, a refuse-discharging hopper arranged within said drum and provided with a chute extending thru an end wall thereof, a fluid supply pipe extending thru one end of said filter drum and discharging radially outward against the reticulated peripheral wall of said filter drum, and a plurality of screening residue-propelling vanes presented inwardly from the peripheral wall of said filter drum, said vanes being provided with hinged extensions adapted therewith to form refuse-elevating buckets and to depend therefrom for adapting said buckets to discharge into said hopper.

11. In a filter of the character described, the combination with a filter drum rotatable on a substantially horizontal axis, said filter drum comprising axially-spaced end walls provided with central circular openings therein and a reticulated peripheral wall, rotary supports in rotating engagement with the peripheral edges of the openings in said end walls, means for rotating one of said rotary supports, a refuse-discharging hopper arranged within said drum, a fluid supply-pipe extending thru the opening in one end wall of said filter drum and discharging radially outward against the reticulated peripheral wall of said filter drum, part-circular guides spaced inwardly from and concentrically with respect to said reticulated peripheral wall of said filter drum, said guides extending to and above one upper edge of said hopper, and a plurality of radial vanes presented inwardly from the peripheral wall of said filter drum, said vanes being provided with movable extensions adapted to slidably engage said part-circular guides.

12. In a filter of the character described, the combination with a receiving tank for filtered liquid, of a filter drum rotatable on a substantially horizontal axis and arranged to discharge filtered liquid into said receiving tank, said filter drum comprising axially-spaced end walls provided with central circular openings therein, and a reticulated peripheral wall, parallel shafts extending thru said openings, rollers mounted on said shafts and rotatably engaging the peripheral edge of the opening in one of said end walls, an annular gear extending around the opening in the other end wall thereof, gears mounted on said shafts and meshing with said annular gear, means for driving one of said shafts, a refuse-discharging hopper arranged within said drum and provided with a chute extending thru the central opening at one end thereof, a fluid supply pipe extending thru the opening in one end wall of said filter drum and discharging radially outward against the reticulated peripheral wall of said filter drum, part-circular guides spaced inwardly from and concentrically with respect to said reticulated peripheral wall of said filter drum, said guides extending from said fluid supply pipe to and above one upper edge of said hopper, a plurality of radial vanes presented inwardly from the peripheral wall of said filter drum, said vanes being provided with movable extensions adapted to slidably engage said part-circular guides, and a downwardly-discharging supply pipe for cleansing fluid extending transversely across and above said filter drum.

13. In a rotary filter, the combination with a tank for filtered fluid, of a filter drum rotatable on a substantially horizontal axis within said tank, said filter drum being provided with a refuse-screening peripheral wall and with an axial opening in one end thereof, a refuse-hopper arranged within said rotary drum and having a chute connected thereto and extending through said axial opening, part-circular guides spaced inwardly from and arranged concentrically with respect to the peripheral wall of said filter drum, said guides extending downwardly from the horizontal axial plane of said rotary drum on one side of said axis around and under said hopper and upwardly on the other side of said axis to a level adjacent the upper edge of said hopper, and a plurality of vanes presented inwardly from said peripheral wall, said vanes being provided with movable extensions slidably engaging said part-circular guides.

14. In a gravity filter, the combination with a filter screen movable thru successive zones of movement, said screen being adapted during one of said zones of movement to effect a filtration by gravity of a fluid delivered thereto and during another of said zones of movement to dump the refuse of filtration by gravity, of a blade projecting from and movable with said filter screen, said blade during said successive zones of movement receiving refuse from said screen and discharging it by gravity, and means for supplying unfiltered fluid to said screen, said blade being provided with a movable leaf movable from a position normal to said blade to a position substantially in a plane with said blade.

15. In a gravity-filter machine, the combination with a refuse-discharging hopper, of a supply pipe for fluid to be filtered, a filter-screen movable over a path adapting it to receive fluid from said supply pipe and to discharge refuse into said refuse-discharging hopper, a blade connected to said filter blade and in a divergent position with respect thereto, said blade being provided with an extension leaf movably connected thereto, and means for guiding said extension leaf, said guiding means being adapted to retain said extension leaf in flexed relation to said blade during its movement at a distance from said hopper and to permit said leaf to assume a position in which refuse is passed by gravity as said blade approaches said hopper.

J. DIAZ COMPAIN.